(12) United States Patent
Bulan et al.

(10) Patent No.: US 9,317,752 B2
(45) Date of Patent: Apr. 19, 2016

(54) METHOD FOR DETECTING LARGE SIZE AND PASSENGER VEHICLES FROM FIXED CAMERAS

(71) Applicant: Xerox Corporation, Norwalk, CT (US)

(72) Inventors: Orhan Bulan, Ankara (TR); Wencheng Wu, Webster, NY (US); Yao Rong Wang, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 13/922,336

(22) Filed: Jun. 20, 2013

(65) Prior Publication Data

US 2014/0376769 A1 Dec. 25, 2014

(51) Int. Cl.
*G06K 9/00* (2006.01)

(52) U.S. Cl.
CPC .................................. *G06K 9/00771* (2013.01)

(58) Field of Classification Search
None
See application file for complete search history.

(56) References Cited

U.S. PATENT DOCUMENTS

| | | | |
|---|---|---|---|
| 6,285,297 B1 | 9/2001 | Ball | |
| 2005/0267657 A1* | 12/2005 | Devdhar | 701/35 |
| 2006/0140447 A1* | 6/2006 | Park et al. | 382/104 |
| 2008/0273752 A1* | 11/2008 | Zhu et al. | 382/103 |
| 2009/0074250 A1* | 3/2009 | Takahashi et al. | 382/104 |
| 2011/0243376 A1* | 10/2011 | Luke | G06K 9/3241 |
| | | | 382/103 |
| 2012/0148092 A1* | 6/2012 | Ni et al. | 382/103 |
| 2012/0263346 A1* | 10/2012 | Datta et al. | 382/103 |
| 2013/0182908 A1* | 7/2013 | Nishimura et al. | 382/104 |
| 2014/0036076 A1* | 2/2014 | Nerayoff et al. | 348/148 |
| 2014/0037142 A1* | 2/2014 | Bhanu et al. | 382/103 |

OTHER PUBLICATIONS

Haselhoff, A., and A. Kummert. "A vehicle detection system based on haar and triangle features." Intelligent Vehicles Symposium, 2009 IEEE. IEEE, 2009.*

Hsieh, Chen-Chiung, Wei-Ru Lai, and Albert Chiang. "A real time spatial/temporal/motion integrated surveillance system in compressed domain." Intelligent Systems Design and Applications, 2008. ISDA'08. Eighth International Conference on. vol. 3. IEEE, 2008.*

Lai, Andrew HS, George SK Fung, and Nelson HC Yung. "Vehicle type classification from visual-based dimension estimation." Intelligent Transportation Systems, 2001. Proceedings. 2001 IEEE. IEEE, 2001.*

Aly, Mohamed. "Survey on multiclass classification methods." Neural Netw (2005): 1-9.*

(Continued)

*Primary Examiner* — Chan Park
*Assistant Examiner* — Geoffrey E Summers
(74) *Attorney, Agent, or Firm* — Fay Sharpe LLP

(57) ABSTRACT

A method for detecting parking occupancy includes receiving video data from a sequence of frames taken from an associated image capture device monitoring a parking area. The method includes determining at least one candidate region in the parking area. The method includes comparing a size of the candidate region to a size threshold. In response to size of the candidate region meeting and exceeding the size threshold, the method includes determining whether the candidate region includes one of at least one object and no objects. The method includes classifying at least one object in the candidate region as belonging to one of at least two vehicle-types. The method further includes providing vehicle occupancy information to a user.

10 Claims, 5 Drawing Sheets

(56) References Cited

OTHER PUBLICATIONS

Grauman, Kristen, and Bastian Leibe. "Generic Object Detection: Finding and Scoring Candidates." Visual Object Recognition. San Rafael, CA: Morgan & Claypool, 2011. 79-86. Print.*

U.S. Appl. No. 13/835,386, filed Mar. 15, 2013, entitled, "Two-Dimensional and Three-Dimensional Sliding Window-Based Methods and Systems for Detecting Vehicles", by Bulan et al.

U.S. Appl. No. 13/836,310, filed Mar. 15, 2013, entitled, "Methods and System for Automated In-Field Hierarchical Training of a Vehicle Detection System", by Wu et al.

U.S. Appl. No. 13/461,266, filed May 1, 2012, entitled "Video-Based Method for Detecting Parking Boundary Violations", by Bulan et al.

U.S. Appl. No. 13/441,269, filed Apr. 6, 2012, entitled "System and Method for Available Parking Space Estimation for Multispace On-Street Parking", by Bulan et al.

Neubeck et al., "Efficient Non-Maximum Suppression", ICPR, 2006, 6 pgs.

Dalal et al., "Histograms of Oriented Gradients for Human Detection", CVPR, 2005, 8 pgs.

Ojala et al., "A Comparative Study of Texture Measures with Classification Based on Feature Distributions", Pattern Recognition 1996, vol. 29, pp. 51-59.

Nilsson et al., "Face Detection Using Local SMQT Features and Split Up SNoW Classifier", IEEE International Conference on Acoustics, Speech, and Signal Processing, 2007, pp. 589-592.

Perronnin et al., Fisher Kernels on Visual Vocabularies for Image Categorization, CVPR, 2007, 8 pgs.

Csurka et al., "Visual Categorization with Bags of Keypoints", ECCV SLCV, 2004, 16 pgs.

Perronnin et al., "Improving the Fisher Kernel for Large-Scale Image Classification", ECCV, 2010, pp. 1-14.

Stauffer et al., "Adaptive Background Mixture Models for Real-Time Tracking", in Proc. of the 1999 Conf. on Computer Vision and Pattern Recognition, 1999, pp. 2246-2252.

Oliver et al., "A Bayesian Computer Vision System for Modeling Human Interactions", IEEE Transactions on PAMI, pp. 831-843.

Lo et al., "Automatic Congestion Detection System for Underground Platforms", Proc. of 2001 Int. Symp. on Intell. Multimedia, Video and Speech Processing, pp. 158-161.

Zhang, "A Flexible New Tecnique for Camera Calibration", IEEE Trans. on Pattern Analysis and Machine Intelligence, 2000, vol. 22 (11), pp. 1330-1334.

* cited by examiner

METHOD FOR DETECTING LARGE SIZE AND PASSENGER VEHICLES FROM FIXED CAMERAS

BACKGROUND

The present disclosure relates to a video-based method and system for detecting vehicle data based on size characteristics of a candidate region within an image capture device's field of view. The disclosure finds application in parking space management and enforcement. However, it is appreciated that the present exemplary embodiments are also amendable to other like applications.

A video-based parking management system monitors select parking areas to provide real-time vehicle detection and parking occupancy data. One area that is monitored by the system can include on-street parking lanes. These areas can be divided into stalls for transportation and parking space management purposes. FIG. 1A illustrates an on-street single-space parking scenario, also known as stall-based parking, in which each parking space is defined in a parking area by clear boundaries. An on-street parking area 10 extends along a curb on a street 12. The parking area 10 is more specifically defined by a parking lane that is divided into a number of single spaces 14-18, each designating one space per vehicle using markings (shown in phantom) on the street. Three vehicles 20-24 are parked in the parking area 10 and each vehicle is properly parked inside the boundaries of a space 14-18. Video cameras 26 are installed nearby for continuously monitoring the parking area 10. The cameras 26 provide video feed to a processor of the system, which analyzes the video data to determine whether there is an available space 14-18.

Mainly, this management system can inform a user about the availability of parking spaces for reducing fuel consumption and traffic congestion. In another scenario, video-based technology can monitor vehicle positions relative to parking space boundaries for enforcing parking boundary regulations as well as other law enforcement regulations.

This known system localizes a parked vehicle within a candidate region where a vehicle is known to potentially exist. The system detects the vehicle by exploiting spatial and temporal correlation between neighboring frames in a video sequence. While the system can detect passenger vehicles with high accuracy, it can partially detect and/or miss larger-sized vehicles, such as commercial vehicles including, but not limited to, certain trucks, semi-trailers, busses, coaches, trailers, and commercial vans.

FIGS. 1B and 1C show an example scenario where this error may occur as a result of the conventional method, which applies a single classifier that is trained by using a mixture (i.e., percentage) of passenger vehicles (i.e., cars) and (to) large vehicles (e.g., trucks or buses). The fraction of the mixture is a direct outcome of what was observed on-site. The fraction of large vehicles is typically very small for a street, and thus the accuracy of detecting large vehicles is typically lower when using this approach. Consider the following problematic example. A first vehicle 28 is properly parked within the boundaries of the space 14. However, a second larger vehicle 30 is parked within the boundaries of a space 16 and into at least one adjacent space 18, thus occupying multiple spaces 16, 18. The system divides the commercial vehicle 28 into multiple objects, each of which is treated as a separate passenger vehicle which is an inaccurate representation of the actual parked vehicles.

One contemplated method is to train the single classifier in the known system using a mixture of different types of vehicles across a range of various sizes. However, the variety of vehicles used to train the classifier can weaken accuracy since it increases the possibility of a misidentified object. More specifically, a decision is made for what fraction of the mixture should be included in the training for each site. This decision is challenging because it may cause a potential trade-off between vehicle types, by strengthening the identification of one vehicle type at the expense (i.e., by weakening the identification) of another. In certain scenarios, the identification of both vehicle types can weaken due to confusion. For example, if the training set contains mostly passenger vehicles, this single classifier may not perform well for classifying large vehicles as shown in FIG. 1C. The classification of larger vehicles may improve by increasing the fraction of large vehicles in the training set, but this approach may in-turn weaken the classification of passenger vehicles. To this extreme, if a significant number of large vehicles are included in the training set, the classifier may start to fail at classifying passenger vehicles. Even if a good mixture exists of the various types of vehicles for training a single classifier, the process, to meet a preferred mixture, can be manually intensive and cumbersome to implement for each camera in a large scale deployment.

Because the presence of the larger-sized vehicle can cause the known system to err when it estimates the availability and/or number of parking spaces, an improved video-based approach is desired which more accurately detects passenger and larger-sized vehicles

INCORPORATION BY REFERENCE

The disclosure of co-pending and commonly assigned U.S. patent application Ser. No. 13/835,386, filed Mar. 15, 2013, entitled, "Two-Dimensional And Three-Dimensional Sliding Window-Based Methods And Systems For Detecting Vehicles", by Bulan et al., is totally incorporated herein by reference.

The disclosure of co-pending and commonly assigned U.S. patent application Ser. No. 13/836,310, filed Mar. 15, 2013, entitled, "Methods And System For Automated In-Field Hierarchical Training Of A Vehicle Detection System", by Wu et al., is totally incorporated herein by reference.

The disclosure of co-pending and commonly assigned U.S. Ser. No. 13/461,266, filed May 1, 2012, entitled "Video-Based Method for Detecting Parking Boundary Violations", by Bulan et al., is totally incorporated herein by reference.

The disclosure of co-pending and commonly assigned U.S. patent application Ser. No. 13/441,269, filed Apr. 6, 2012, entitled "System and Method For Available Parking Space Estimation For Multispace On-Street Parking", by Bulan et al. is totally incorporated herein by reference.

BRIEF DESCRIPTION

One embodiment of the disclosure relates to a method for detecting parking occupancy. The method includes receiving video data from a sequence of frames taken from an associated image capture device monitoring a parking area. The method includes determining at least one candidate region in the parking area. The method includes comparing a size of the candidate region to a size threshold. In response to size of the candidate region meeting and exceeding the size threshold, the method includes determining whether the candidate region includes one of a single object, multiple objects, and no object. The method includes classifying at least one object in the candidate region as belonging to one of at least two vehicle-types. The method further includes providing vehicle occupancy information to a user.

Another embodiment of the disclosure relates to a monitoring system for detecting a vehicle. The system includes a vehicle detection device having a memory for storing modules and a processor for executing the modules. The device includes a video buffering module for receiving video data from a sequence of frames taken from an associated image capture device monitoring a parking area. The device includes a candidate region determination module for determining at least one candidate region in the parking area. The device includes a vehicle detection and classification module for detecting and classifying the object as belonging to one of at least two vehicle-types. The vehicle detection and classification module compares a size of the candidate region to a size threshold. In response to size of the candidate region meeting and exceeding the size threshold, the vehicle detection and classification module determines whether the candidate region includes one of a single vehicle, multiple vehicles, and no vehicle.

DETAILED DESCRIPTION

The present disclosure relates to a vehicle determination and classification device that detects and differentiates between various-sized vehicles within a region of interest (ROI) in a video sequence captured with a fixed image capture device and field of view. The disclosure includes two phases. In a (first) training phase performed offline, at least two classifiers are trained, each for identifying one of multiple, different vehicle types. In an (second) online phase, the trained classifiers are assigned priorities for a sequence of analyzing a candidate region. Characteristics of the candidate region are used to detect different-sized vehicles, which can mainly be a larger-sized vehicle relative to a smaller-sized vehicle. For example, a first vehicle type classifier can detect commercial (-sized) vehicles and a second vehicle type classifier can detect passenger (-sized) vehicles. For illustrative purposes, the terms "commercial" and "passenger" vehicles are used herein for describing larger and typical sized vehicles. However, the teachings herein are amendable to embodiments that detect between passenger vehicles and motorcycles, commercial vehicles and motorcycles, and all of commercial vehicles, passenger vehicles, and motorcycles. In the latter contemplated embodiment, at least a third vehicle type classifier can be included in the system, and the system assigns a priority between the three vehicle types. In one embodiment, the system performs the method for detecting the vehicles in sequence from largest-sized vehicles to smallest-sized vehicles.

Figure 2:
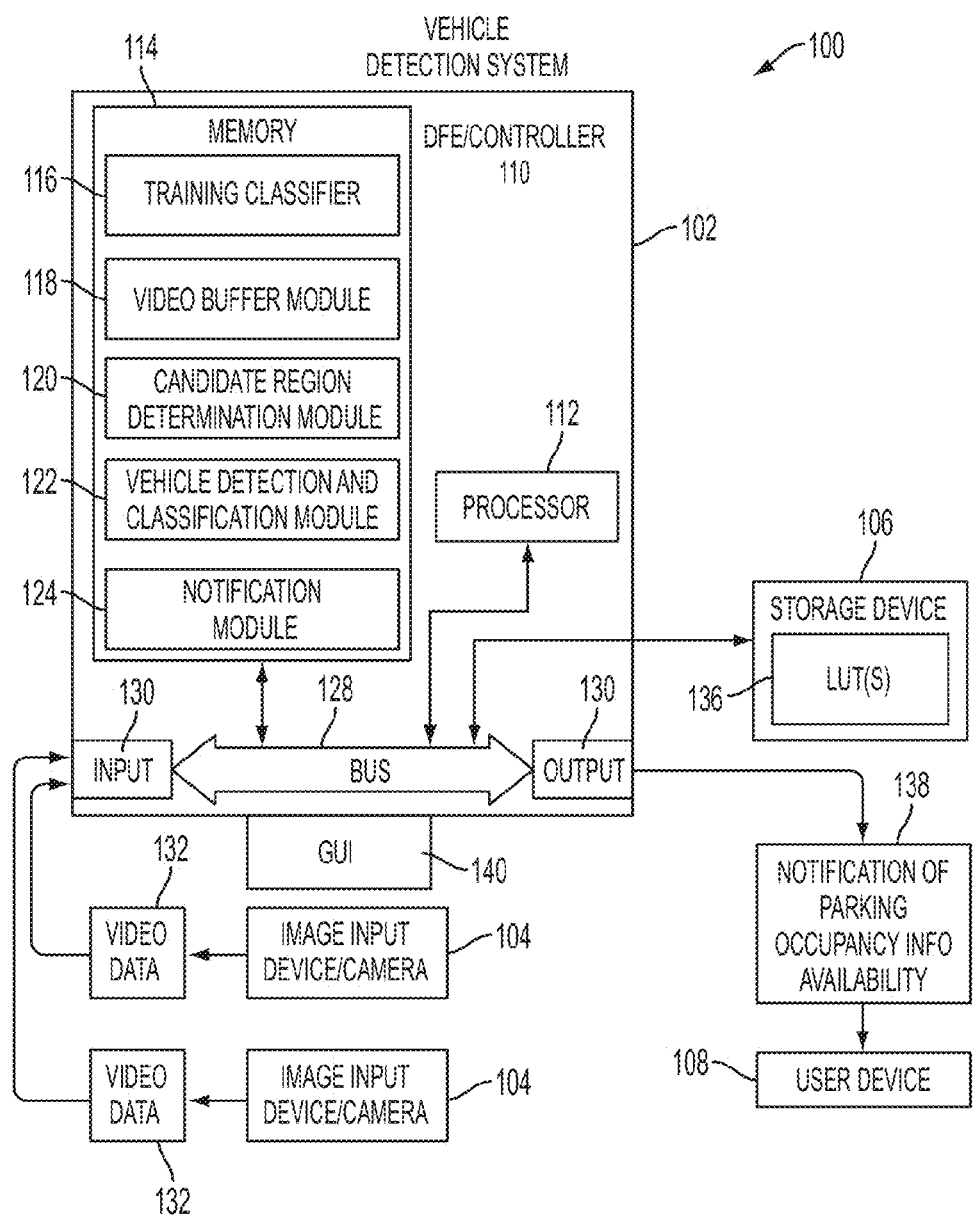
FIG. 2 is a schematic illustration of a video-based vehicle detection system according to one embodiment.

FIG. 2 is a schematic illustration of a video-based vehicle detection 100 in one exemplary embodiment. The system includes a vehicle type determination device 102, an image capture device 104, and a storage device 106, which may be linked together by communication links, referred to herein as a network. In one embodiment, the system 100 may be in further communication with a user device 108. These components are described in greater detail below.

The vehicle type determination device 102 illustrated in FIG. 2 includes a controller 110 that is part of or associated with the device 102. The exemplary controller 110 is adapted for controlling an analysis of video data received by the system 100. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 3 and 4. In some embodiments, the processor 112 and memory 114 may be combined in a single chip.

The device 102 may be embodied in a networked device, such as the image capture device 104, although it is also contemplated that the device 102 may be located elsewhere on a network to which the system 100 is connected, such as on a central server, a networked computer, or the like, or distributed throughout the network or otherwise accessible thereto. The training, vehicle detection, and vehicle type determination phases disclosed herein are performed by the processor 112 according to the instructions contained in the memory 114. In particular, the memory 114 stores a training module 116, which trains at least two classifiers; a video buffering module 118, which captures video of a select parking area or similar ROI; a candidate region determination module 120, which determines at least one candidate region, which can include a section across multiple parking stalls and/or single spaces in the captured video; a vehicle detection and classification module 122, which detects and classifies the object in the detected region as belonging to one of a first (larger) vehicle type and a second (smaller) vehicle type; and, a vehicle management notification module 124, which notifies a user about the vehicle classified under a select classification. Embodiments are contemplated wherein these instructions can be stored in a single module or as multiple modules embodied in different devices. The modules 116-124 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the detection device 102 may be all connected by a bus 128.

With continued reference to FIG. 2, the device 102 also includes one or more communication interfaces 130, such as network interfaces, for communicating with external devices. The communication interfaces 130 may include, for example, a modem, a router, a cable, and/or Ethernet port, etc. The communication interfaces 130 are adapted to receive video and/or image data 132 as input.

The device 102 may include one or more special purpose or general purpose computing devices, such as a server computer, controller or digital front end (DFE), or any other computing device capable of executing instructions for performing the exemplary method.

FIG. 2 further illustrates the device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends all the single parking spaces being monitored and enforced. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the detection device 102. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 2, the system 100 includes a storage device 106 that is part of or in communication with the device 102. In a contemplated embodiment, the device 102 can be in communication with a server (not shown) that includes a processing device and memory, such as storage device 106, or has access to a storage device 106, for storing look-up tables (LUTs) 136. In contemplated embodiments, the LUTs can also associate area-specific parking regulations and conditions with each particular camera used by the system 100.

With continued reference to FIG. 2, the video data 132 undergoes processing by the device 102 to output the desired information. In one embodiment, this information can include notice of parking space availability 138. In another embodiment, the notice can relay that the larger vehicle is occupying more than one parking space. When a larger vehicle occupies more than one parking space, its parking rate may need to be adjusted. In this manner, the notice can be provided to a parking billing authority. The notice can be provided to the user in a suitable form on a graphic user interface (GUI) 140 or to a user device 108, such as a computer belonging to a driver or an enforcement authority. The user device 108 can include a computer at a dispatch center, a smart phone belonging to an enforcement driver in transit or to a vehicle computer and/or GPS system that is in communication with the device 102, although there is no limitation made herein to these examples. In an embodiment where the system is used to manage and/or monitor regulated parking areas, the user device 108 can further include a central server and repository that can automatically charge a parking fee to an account associated with a registrant of the parked vehicle, can automatically issue a ticket to the registrant, and/or can automatically provide the registrant's information to the select parking and/or billing authority. In another contemplated embodiment, the user-device 108 can belong to a driver of a moving vehicle that is searching for a parking space or a parked vehicle that is parked in the space. In the latter embodiment, the driver can be put on notice that the vehicle should be moved. The GUI 140 can include a display, for displaying information to users, and a user input device, such as a keyboard or touch or writable screen, for receiving instructions as input, and/or a cursor control device, such as a mouse, trackball, or the like, for communicating user input information and command selections to the processor 112.

Figure 3:
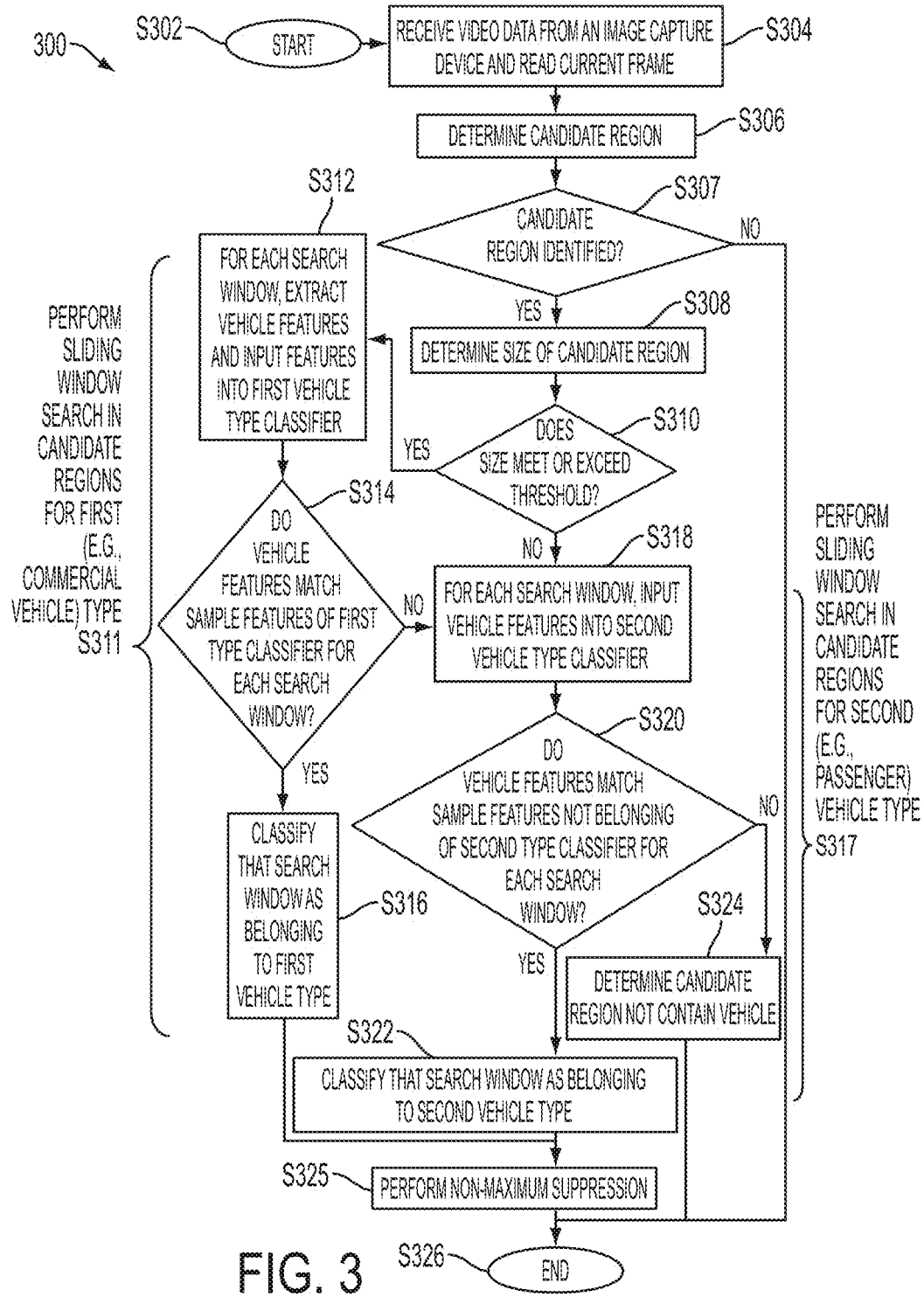
FIG. 3 is a flowchart describing the detailed method for detecting vehicles according to one embodiment.

FIG. 3 is a flowchart describing a method 300 for detecting different sized vehicles and/or vehicle types. FIG. 3 more specifically describes an online operational phase performed by the system 100. The method starts at S302. The video buffering module 118 receives video data from a sequence of frames taken from the image capture device 104 monitoring a select parking area. The system reads video data from a frame at S304. The system can process each frame, or every nth frame, in the sequence detecting the presence of an object of interest.

Performing a sliding window search for detecting the object of interest (e.g., a large-size vehicle or a small-size vehicle) for the entire region in all the frames of a captured video can be computationally expensive, especially when the resolution and the frame rate of the captured video is high. This is because vehicles are only at the parking area of interest on the image plane. Therefore, a search is desirable for being performed only within the parking area, i.e., the parking region of interest (ROI). Even though the searching can be limited within the parking ROI, the computation can still be too expensive to perform for all the captured frames. In order to satisfy the real-time processing requirement, for each frame, the system 100 first identifies candidate regions in the captured video where a newly parked vehicle may exist and then performs a sliding-window search only within the identified candidate regions. By searching for vehicles only in detected candidate regions, the system can increase its computational efficiency and detection performance, improve its detection accuracy by reducing the search space, and eliminate possible false detections from non-candidate regions in the ROI.

Therefore, the video buffering module 116 provides the video data to the candidate region determination module 120. The candidate region determination module 120 determines a candidate region within the select frame at S306. More specifically, the module 120 searches between frames for detection of an object entering a scene (i.e., the ROI) or moving within the scene.

For the first frame, a candidate region can include the entire parking ROI. For remaining frames, these identified candidate regions can typically include sub-regions of the ROI. As mentioned above, the candidate regions for a frame are regions where a newly parked vehicle may exist. As a simple example, if the image content within the ROI of a current frame is the same as the content within the previous frame, the system can conclude that no newly parked vehicle entered the scene. Therefore, no candidate region is identified in the current frame. Using this example, one approach for identifying candidate regions can be made through video processing, which is discussed below.

In one embodiment, to determine the candidate region at S306, the system 100 performs a background modeling & subtraction approach and/or a motion detection approach for identifying foreground regions and, thus, detecting a newly appeared object(s) within the ROI. One approach is described in co-pending and commonly assigned U.S. patent application Ser. No. 13/441,269, filed Apr. 6, 2012, entitled "System and Method For Available Parking Space Estimation For Multispace On-Street Parking", by Bulan, et al. the content of which is totally incorporated herein by reference.

In another embodiment, a background subtraction approach can be used when the video is captured from a fixed image capture device. For example, when an image of the background, without any foreground objects, is available, background removal computes the absolute intensity/color difference between the known or estimated background image and each image in the video sequence. Pixels for which the computed distance in the intensity/color space is small are classified as background pixels. There are several techniques for background estimation based on Gaussian mixture models, eigenbackgrounds (which use principal component analysis), and computation of running averages (that gradually update the background after each next frame). One technique is provided in co-pending and commonly assigned U.S. Ser. No. 13/461,266, filed May 1, 2012, entitled "Video-Based Method for Detecting Parking Boundary Violations", by Orhan, et. al., which is totally incorporated herein by reference.

Yet in another method for determining the candidate region at S306, a vehicle is tracked into a parking spot using a coherent cluster of motion vectors (e.g., compression-type motion vectors obtained by using a block matching algorithm) that go to zero length for a threshold time within a parking zone. Within a frame associated with the parked vehicle, a region (i.e., the candidate region) is selected based on where the collection of pixels were last associated with the coherent cluster of motion vectors.

Therefore, in summary, the module 120 determines the candidate region as the region within the frame where the object(s) is detected. Because the detected candidate regions may contain any one or more of a parked large vehicle, a parked small vehicle, a parked small vehicle with shadow, two closely parked small vehicles, and only shadow, etc., further processing is needed.

The candidate region is identified as being a region where the object is present. In response to no candidate region being identified (NO at S307), the method ends for the current frame at S326. However, in response to a candidate region being determined (YES at S307), the candidate region determination module 120 transmits the information to the vehicle detection and classification module 122, which determines the size of each candidate region at S308. There is no limit made herein to a method used for calculating the size of the detected candidate region; rather, the size can be calculated in physical units or in terms of image coordinates. In one embodiment, the module 122 can calculate the size of each detected candidate region using, for example, geometric attributes (such as, for example, area, length, height, width, eccentricity, and a combination of the above). In another embodiment, the size can be determined from a primitive geometric function (e.g., an ellipse) that is fitted to an outline of the detected object. In yet another embodiment, the module 122 can calculate the size by estimating a physical length of the candidate region by mapping pixel coordinates to real-world length units. Using any known method, the camera is first calibrated offline to determine its parameters, which associate its two-dimensional image coordinates with three-dimensional coordinates in the real/physical world. In this manner, any coordinate (x, y, z) corresponding with a three-dimensional location in the physical world can be estimated/calculated from a select two-dimensional (i, j) image coordinate. Once the candidate region is detected and its front and back ends are located, the three-dimensional coordinates of the image are evaluated from the two-dimensional images using the camera model. The physical length of the candidate region is computed using these coordinates.

In the embodiment where the background subtraction approach is used to determine the size of the candidate region, the system can calculate the size using attributes of a binary image generated during the background subtraction process.

The size is compared to a size threshold at S310. In one embodiment where the system 100 can be used to monitor vehicle occupancy in parking spaces, for example, the threshold can be predetermined based on a size of a commercial vehicle that can properly fit within the parking space being monitored by the camera 104. In response to the size of the candidate region meeting and/or exceeding the size threshold (YES at S310), the method proceeds to S311 for performing a sliding window search in the candidate regions for detecting and classifying a first vehicle type using a trained first-vehicle-type classifier. In response to the size of the candidate region being lower than the size threshold (NO at S310), the method proceeds to S317 for performing a sliding window search in the candidate regions for detecting and classifying a second vehicle type using a trained second-vehicle-type classifier. These two sets of processes (S311 and S317) are similar with the exception that the vehicle classifiers being used to perform them are different. More details are discussed below.

As mentioned, at this stage each candidate region is treated as an object with features. In response to the size of a candidate region meeting and/or exceeding the size threshold (YES at S310), the vehicle detection and classification module 122 performs, for example, a window-based search to detect larger-sized vehicles S311 within the detected candidate region. For each window, features of the object are extracted from the current frame and input into a first vehicle type classifier at S312. This first vehicle type classifier can be trained, for example, using sample features of similar-sized vehicles. In the illustrative embodiment, for example, the first vehicle type classifier can be a commercial vehicle classifier that was trained with commercial vehicles that are longer than the parking space being monitored by the image capture device 104.

In another embodiment, the first vehicle type classifier can be trained using features of passenger vehicles. Regardless of the vehicle type assigned to the first classifier, the features are analyzed against samples for larger-sized vehicles before being analyzed against samples for smaller-sized vehicles. In simpler terms, the features are applied to the larger-vehicle classifier at S312 before being applied to a smaller-vehicle classifier at S318. And whether the features are even applied to the smaller-vehicle classifier at S318 can be determined based on the results of the sliding window search at S311. A reason for this priority is for the system to avoid error by misclassifying two smaller objects as a larger object. By first analyzing the object using the first (larger) vehicle type classifier, the system can determine whether to rule out a larger vehicle type in scenarios where the candidate region actually includes multiple smaller-sized vehicles.

For each search window, the object features are compared to the sample features of the first vehicle type classifier at S314. In other words, the module 122 determines if the extracted features match the sample features of the first vehicle type classifier. Mainly, the first vehicle type classifier assigns a score indicative of a degree that the extracted features match the trained sample features, and the module 122 compares the score to a confidence threshold. The confidence threshold is a predetermined "larger-vehicle" detection threshold. In response to the first vehicle type classifier assigning the window a score that meets or exceeds the confidence threshold, the module 122 determines that the extracted and sample features match. In response to the features matching the sample features (YES at S314), the search window is classified as positive. That is, the search window is classified as belonging to the first vehicle type at S316. In other words, the window contains a larger-sized vehicle and a 'commercial' vehicle in the illustrative embodiment. In the illustrated embodiment, the commercial vehicle is determined as occupying at least one space within the candidate region and/or two spaces that are each designated for one smaller-sized passenger vehicle.

In the illustrated embodiment, where the vehicle detection and classification is performed in a window-based search manner, a non-maximum suppression method can be used to eliminate overlapping "vehicle" windows including the same vehicle at S325. The non-maximum suppression is performed across windows classified as positive (i.e., windows having a classification score higher than threshold). An example of non-maxima suppression method includes determining a window having a highest classification score, maintaining this window while removing all windows that overlap with it for more than a predetermined T percentage of area, and repeating this process for the remaining windows until no more windows remain. A method for performing a window-based search is disclosed in co-pending and commonly assigned U.S. patent application Ser. No. 13/835,386, filed Mar. 15, 2013, entitled, "Two-Dimensional And Three-Dimensional Sliding Window-Based Methods And Systems For Detecting Vehicles", by Bulan et al., and is incorporated herein by reference.

After detecting the first type vehicle on the image plane, another window search can be performed for each search window at S317, within the candidate region where no first type vehicle was detected, and more specifically, to detect smaller-sized vehicles. Similarly, in response to the first vehicle type classifier assigning a window a score that does not meet or exceeds the confidence threshold, the module 122 determines that the features do not match and the same set of extracted features are used in the sliding window search performed as part of the second vehicle type detection process at S317.

In response to the size being less than the size threshold (NO at S310) or the features not matching the sample features, for each window features of the object extracted from the current frame are input into the second vehicle type classifier at S318. This second vehicle type classifier can be trained, for example, using sample features of similar-sized vehicles during an offline phase. In the illustrative embodiment, the second vehicle type classifier is trained to identify the second vehicle type as belonging to passenger vehicles. The second vehicle type classifier can be trained with passenger vehicles having dimensions that fit into the parking space being monitored by the image capture device 104. Only a search for a smaller- (e.g., passenger-) sized vehicle is performed in the candidate region because a larger-sized vehicle was not located in the detected region.

In another embodiment, rather than assigning the passenger vehicle as the first vehicle type, the second vehicle type classifier can be trained using features of motorcycles.

The object features are compared to the sample features of the second vehicle type classifier for each window at S320. By comparing, the module 122 determines if the extracted features match the sample features of the second vehicle type classifier. Mainly, the second vehicle type classifier assigns a score indicative of a degree that the extracted features match the trained second type vehicle sample features, and the module 122 compares the score to a confidence threshold. The confidence threshold is a predetermined "smaller-vehicle" detection threshold. In response to the second vehicle type classifier assigning the window a score that meets or exceeds the confidence threshold, the module 122 determines that the extracted and sample features match.

In response to the features matching the sample features of the second vehicle type classifier (YES at S320), the window is classified as positive. That is, the search window is classified as belonging to the second vehicle type at S322. In other words, the vehicle is a smaller-sized vehicle. Furthermore, the non-maximum suppression process can be used to eliminate overlapping windows including the same vehicle at S325.

In response to the second vehicle type classifier assigning the window a score that does not meet or exceed the confidence threshold, the module 122 determines that the extracted and sample features do not match. In response to the object features not matching the sample features of the second vehicle type classifier (NO at S320), the module 122 determines that the candidate region does not contain a vehicle at S324. Further analysis can be performed for determining whether any detected object is a vehicle smaller than the second vehicle type (e.g., a motorcycle) or a non-vehicle, such as a pedestrian and/or an occlusion. In one embodiment, the module 122 can classify the window as belonging to a third vehicle type, which can include motorcycles. In another embodiment, the module 124 can repeat the thresholding processes for detecting vehicles smaller than the first and second type vehicles using a third vehicle type classifier, such as one trained with sample images of motorcycles. In yet another embodiment having motorcycles being assigned as the second type vehicle, the module 124 can determine that the window contains an occlusion and/or non-vehicle. The method ends at S326.

The vehicle detection and classification module 122 can provide the classification information to the notification module 124. The notification module 124 can provide appropriate notice of the determination results to the user when applicable. A notification that the identified vehicle belongs to a certain vehicle type can be provided to the user depending on the objective of the system 100, which is amendable to a number of different applications to achieve the desires of the particular user. For example, for a parking occupancy monitoring system, a determination that the vehicle is a larger-sized vehicle can mean that the vehicle is occupying two parking spaces. Therefore, the notification may indicate to the user that the larger-sized/commercial vehicle is violating a parking regulation. In another example, the notification can indicate that the vehicle is violating a parking regulation if a select-sized passenger vehicle is parking in a compact vehicle zone, etc.

Figure 1A:
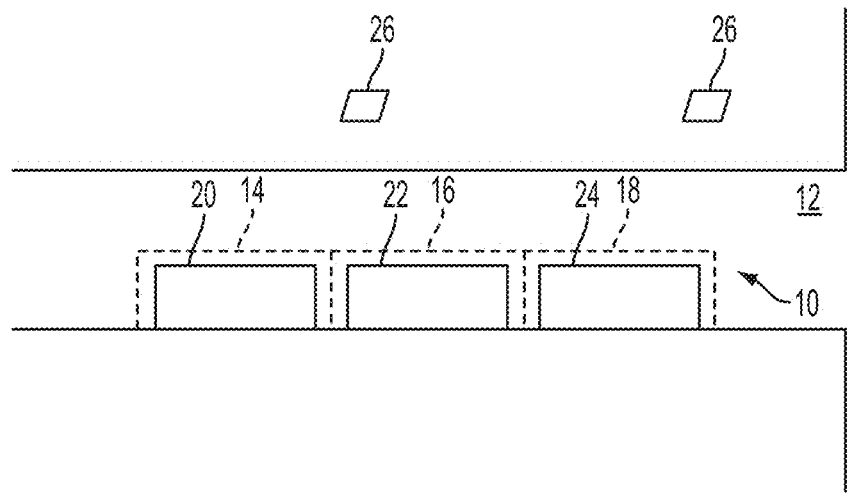
FIG. 1A shows a single-spaced parking area including designated spaces each occupied by a passenger-sized vehicle.
Figure 1B:
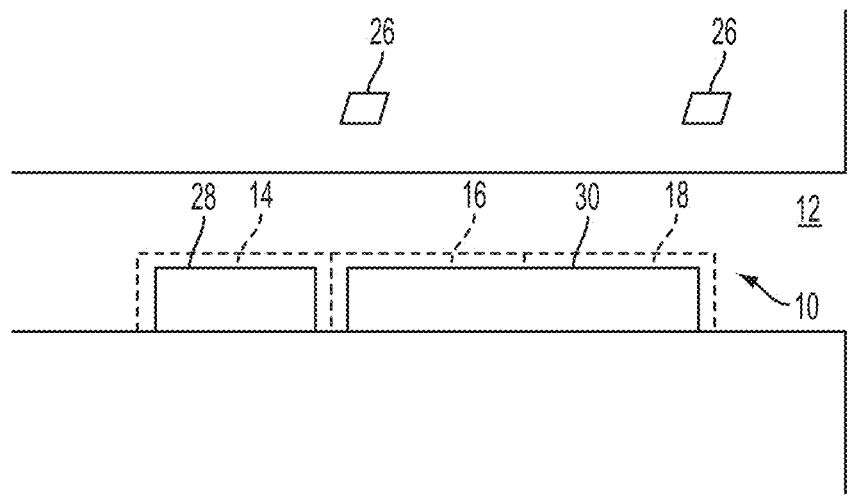
FIGS. 1B and 1C show an example scenario for detecting multiple-sized vehicles in the parking area of FIG. 1A using a conventional approach.
Figure 1C:

One aspect of the sequence provided in the present disclosure is a proper treatment of vehicles since the method detects larger-sized vehicles before smaller-sized vehicles, which are less likely to appear like a commercial vehicle. The detection of larger-sized vehicles (S311) occurs before smaller-sized vehicles (S317) using the at least two trained classifiers. The detections occur in that sequence because a window-based search that is first used to detect passenger cars can typically divide the larger-sized vehicles into multiple parts (as shown in FIG. 1C). Each part would be later treated as a separate vehicle because different regions of larger-sized vehicles can be similar in appearance to regions of a smaller-sized vehicle. For example, the front end of a commercial truck (in FIG. 1C) can have a similar body style to the front end of a passenger truck. Therefore, the desired sequence is performed for detecting the larger size vehicle type rather than vice versa.

Another aspect of the present disclosure is higher accuracy achieved from at least two classifiers. The classifiers are trained offline in a first phase of the disclosure. The classifiers can be trained according to a method provided in U.S. patent application Ser. No. 13/835,386, incorporated herein by reference. In the offline phase, a first classifier is trained by using positive (i.e., vehicle) and negative (i.e., non-vehicle) samples, which are obtained from the camera monitoring the region of interest. The positive samples typically include different types of vehicles (such as, for example, trucks, buses, passenger cars) parked in the region of interest. The vehicles that are within a size range of the first type of vehicle that the classifier is being trained to identify are treated as positive samples and all other vehicles are treated as negative samples. In one embodiment, the negative samples used to train the classifier can include only samples of other vehicle types. In another embodiment, the classifier can be trained to identify negative samples using background images not including vehicles. In another embodiment, a combination of the other vehicle types and empty background images can be used to train the classifier. From the positive and negative samples, a set of features are extracted and used to train the first classifier (e.g., linear/non-linear SVM, logistic regression etc.). The process is repeated for training at least a second classifier to identify a second vehicle type.

Figure 4:
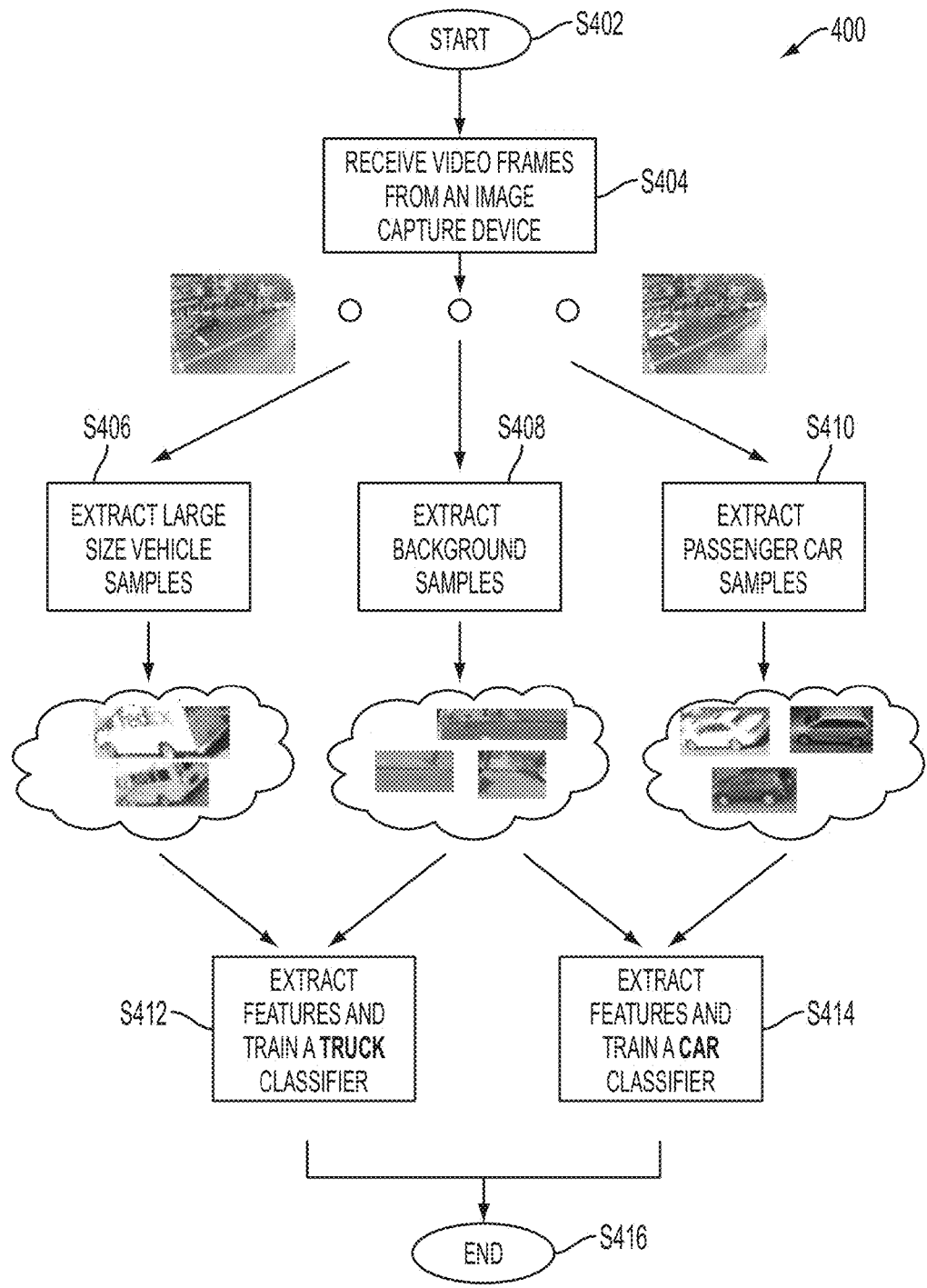
FIG. 4 is a flowchart for describing an offline training process performed as part of a first (offline) phase of the disclosure.

Now referring to FIG. 4, a method 400 for training the classifiers is shown. The method starts at S402. The training module 116 receives video data in the form of multiple frames of data captured from the image capture device at S404. The video data is more specifically provided from a fixed camera that monitors a parking area of interest. To gather enough training samples, the length of the captured video can depend on the level of activity within the parking region. Longer video sequences may be required for parking regions that experience lower activity.

Continuing with FIG. 4, the module 116 extracts samples from the captured video frames for multiple classes of vehicles including larger-size vehicle samples (such as buses, trucks, etc.) at 406, passenger vehicle samples at S408, and background samples (i.e., non-vehicles) at S410. The background samples include the patches from the region of interest without a vehicle as shown in the figure. The samples can be extracted either manually from the captured video or automatically using a hierarchical training approach provided in co-pending and commonly assigned U.S. patent application Ser. No. 13/836,310, filed Mar. 15, 2013, entitled, "Methods And System For Automated In-Field Hierarchical Training Of A Vehicle Detection System", by Wu et al., which is totally incorporated herein by reference.

Once a sufficient set of samples are collected for each class of vehicles, at least two classifiers are trained using a classical, supervised machine learning approach. The illustrated embodiment in FIG. 4 trains two classifiers, but embodiments are contemplated for training any desired number of classifiers. A first vehicle type (e.g., commercial vehicle) classifier is trained using the larger-sized vehicles and background samples at S412. The second vehicle-type (passenger vehicle) classifier is trained using the passenger car and background samples at S414. To train the classifiers, a set of features are extracted from each of the collected samples. These features can be extracted using a conventional approach including, but not limited to, a dimensionality reduction technique, such as principal component analysis (PCA) or linear discriminant analysis (LDA) and the features can include, but are not limited to, texture-based features, such as histogram of oriented gradients (HOG), local binary patterns (LBP), or successive mean quantization transform features (SMQT); features based on color attributes (e.g., color histogram); scale invariant features such as scale invariant feature transform (SIFT) features or speeded up robust features (SURF); and local image descriptors, such as bag of visual words (BOV) or Fisher vectors.

Any combination of the above-listed features can be used to generate a final feature vector. A linear/non-linear classifier, such as linear Support Vector Machine (SVM), can be trained by feeding the select features extracted from a set of training samples (for the select vehicle type) and labels of the training samples to the classifier. The method ends at S416.

As previously mentioned, the trained classifiers are assigned priorities based on the characteristics of the candidate region to enable the classifiers to accurately detect the vehicle types during the online phase.

Although the control methods 300, 400, and 500 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting a vehicle, the method comprising:
    receiving video data from a sequence of frames taken from an associated image capture device monitoring a parking area;
    in response to detecting an object in a current frame, associating the detected object as a candidate region where a newly parked vehicle may exist;
    in response to a size of the candidate region meeting or exceeding a size threshold, performing a sliding window search limited to the candidate region of each frame to extract object features of the detected candidate region from each of multiple windows;
    applying the extracted object features of each window to a first type vehicle classifier trained to classify larger vehicles that are divided into multiple parts each corresponding to a different window in the sliding window search;

acquiring a first score from the first vehicle classifier indicative of a degree that the extracted object features match a trained vehicle of the first vehicle classifier;

in response to the first score meeting or exceeding a first confidence threshold, associating the newly parked vehicle with a large vehicle of a size that extends beyond the bounds of a single parking space;

in response to the first score not meeting or exceeding the first confidence threshold, ruling out the large vehicle and associating the detected object as a candidate region where one or more of a small vehicle and shadow may exist;

also in response to the first score not meeting or exceeding the first confidence threshold, for each window, applying the extracted object features to a second type vehicle classifier trained to classify vehicles that are smaller-sized than the large vehicle;

acquiring a second score from the second type vehicle classifier indicative of a degree that the extracted object features match a trained vehicle of the second vehicle type;

in response to the second score meeting or exceeding a second confidence threshold indicative of a degree that the extracted object features match a trained second vehicle of the second vehicle classifier, associating the newly parked vehicle with one or more small vehicles;

in response to the second score not meeting or exceeding the second confidence threshold, associating the candidate region as not containing a vehicle; and providing information regarding an occupancy of the parking space to a user device base on the associations.

2. The method of claim 1, wherein the detecting an object in a current frame includes:
tracking a vehicle into a parking spot using a coherent cluster of motion vectors whose length go to zero in the parking area; and,
identifying a collection of pixels that were last associated with the coherent cluster of motion vectors.

3. The method of claim 1, wherein the size is calculated by one of calculating a physical length of the candidate region using real-world coordinates mapped from pixel coordinates and calculating an area of the candidate region on the image plane.

4. The method of claim 1
wherein the user device is associated with a user of vehicles located in the parking area.

5. A computer program product comprising a non-transitory computer readable memory storing instructions for performing a method of:
receiving video data from a sequence of frames taken from an associated image capture device monitoring a parking area;
in response to detecting an object in a current frame, associating the detected object as a candidate region where a newly parked vehicle may exist;
in response to a size of the candidate region meeting or exceeding a size threshold, performing a sliding window search limited to the candidate region off each frame to extract object features of the detected candidate region from each of multiple windows;
applying the extracted object features of each window to a first type vehicle classifier trained to classify larger vehicles that are a size capable of being divided into multiple parts each being in a different window of the sliding window searches;
acquiring a first score from the first vehicle classifier indicative of a degree that the extracted object features match a trained vehicle of the first vehicle classifier;

in response to the first score not meeting or exceeding the first confidence threshold, associating the newly parked vehicle with a large vehicle of a size that extends beyond the bounds of a single parking space;

in response to the score not meeting the confidence threshold, ruling out the larger vehicle and associating the detected object as a candidate region where one or more of a small vehicle and shadow may exist;

also in response to the first score not meeting or exceeding the first confidence threshold, for each window, applying the extracted object features to a second type vehicle classifier trained to classify vehicles that are smaller-sized than the large vehicle;

acquiring a second score from the second type vehicle classifier indicative of a degree that the extracted object features match a trained vehicle of the second vehicle type;

in response to the second score meeting or exceeding a second confidence threshold indicative of a degree that the object features match a trained second vehicle of the second vehicle classifier, associating the newly parked vehicle with one or more small vehicles;

in response to the second score not meeting or exceeding the second confidence threshold, associating the candidate region as not containing a vehicle; and providing information regarding an occupancy of the parking space to a user device base on the associations.

6. A monitoring system for detecting a vehicle, the system comprising a vehicle detection device including a processor configured to:
receive video data from a sequence of frames taken from an associated image capture device monitoring a parking area;
in response to detecting an object in a current frame, associate the detected object as a candidate region where a newly parked vehicle may exist;
in response to a size of the candidate region meeting or exceeding a size threshold, perform a sliding window search limited to the candidate region of each frame to extract object features of the detected candidate region from each of multiple windows;
apply the extracted object features of each window to a first type vehicle classifier trained to classify larger vehicles that can be divided into multiple parts each in a different window of the sliding window search;
acquire a first score from the first vehicle classifier indicative of a degree that the extracted object features match a trained vehicle of the first vehicle classifier;
in response to the first score meeting or exceeding a first confidence threshold, associate the newly parked vehicle with a large vehicle of a size that extends beyond the bounds of a single parking space;
in response to the first score not meeting or exceeding the first confidence threshold, rule out the large vehicle and associate the detected object as a candidate region where one or more of a small vehicle and shadow may exist;
also in response to the first score not meeting or exceeding the first confidence threshold, for each window, apply the object features to a second type vehicle classifier trained to classify vehicles that are smaller size than the large vehicle;
acquire a second score from the second type vehicle classifier indicative of a degree that the extracted object features match a trained vehicle of the second vehicle type;
in response to the second score meeting or exceeding a second confidence threshold indicative of a degree that the object features match a trained second vehicle of the second vehicle classifier, associate the detected object with one or more small vehicles occupying the single one or more parking spaces;

in response to the second score not meeting or exceeding the second confidence threshold, associate the parking space as not containing a vehicle; and provide information regarding an occupancy of the parking space to a user device base on the associations.

7. The system of claim 6, wherein the processor is further adapted to:

classify the object as one of a motorcycle, a passenger vehicle and a commercial vehicle.

8. The system of claim 6, wherein the processor is further adapted to:

track a vehicle into a parking spot using a coherent cluster of motion vectors whose length go to zero in the parking area; and, identify a collection of pixels that were last associated with the coherent cluster of motion vectors.

9. The system of claim 8, wherein the processor is further adapted to determine the size of the candidate region by:

extracting at least one feature from the object using a binary mask;

calculate the size using the at least one extracted feature.

10. The system of claim 6, wherein the processor is adapted to calculate the size by one of calculating a physical length of the candidate region using real-world coordinates mapped from pixel coordinates and calculating an area of the candidate region on the image plane.

* * * * *